US006456438B1

(12) United States Patent
Lee et al.

(10) Patent No.: US 6,456,438 B1
(45) Date of Patent: Sep. 24, 2002

(54) VARIABLE IMMERSION VIGNETTING DISPLAY

(75) Inventors: James C. Lee, Plymouth, MN (US); Harry B. Funk, Minneapolis, MN (US)

(73) Assignee: Honeywell Inc., Morristown, NJ (US)

( * ) Notice: Subject to any disclaimer, the term of this patent is extended or adjusted under 35 U.S.C. 154(b) by 0 days.

(21) Appl. No.: 09/372,824

(22) Filed: Aug. 12, 1999

(51) Int. Cl.[7] ............................................. G02B 27/14
(52) U.S. Cl. ...................................... 359/630; 359/631
(58) Field of Search ................................ 359/630, 631, 359/634; 345/7, 8, 9

(56) References Cited

U.S. PATENT DOCUMENTS

| | | | | |
|---|---|---|---|---|
| 4,028,725 A | * | 6/1977 | Lewis | 358/103 |
| 4,805,988 A | | 2/1989 | Dones | 359/4 |
| 4,900,133 A | | 2/1990 | Berman | 349/11 |
| 5,050,966 A | * | 9/1991 | Berman | 359/38 |
| 5,379,140 A | * | 1/1995 | Michel et al. | 359/83 |
| 5,621,572 A | * | 4/1997 | Fergason | 359/630 |
| 5,726,806 A | * | 3/1998 | Holden et al. | 359/630 |
| 5,896,232 A | * | 4/1999 | Budd et al. | 359/630 |
| 6,008,946 A | * | 12/1999 | Knowles | 359/630 |
| 6,160,666 A | * | 12/2000 | Rallison et al. | 359/630 |

FOREIGN PATENT DOCUMENTS

| | | |
|---|---|---|
| EP | 0177134 A | 4/1986 |
| EP | 0454443 A | 10/1991 |
| EP | 0543718 A | 5/1993 |

OTHER PUBLICATIONS

Patent Abstracts of Japan, vol. 1997, No. 5, May 30, 1997 & JP 09 015527 A (Olympus Optical Co Ltd), Jan. 17, 1997 Abstract.
Patent Abstracts of Japan, vol. 007, No. 176 (P–214), Aug. 4, 1983 and JP 58 080616 A (Mitsubishi Denki KK), May 14, 1983 Abstract.
Patent Abstracts of Japan, vol. 014, No. 524 (E–1005), Nov, 16, 1990 & JP 02 220575 A (Eisuke Imanaga), Sep. 3, 1990 Abstract.

* cited by examiner

*Primary Examiner*—Ricky Mack

(57) ABSTRACT

A see through display includes a variably transmissive element positioned between a real world view and an eye of a user, and a generated display optical system for generating a displayed information image superimposed over the real world view in the visual field of the user. The variably transmissive element is controllable to dynamically vary the light intensity passing through the element into the visual field of the user. The variably transmissive element may be spatially addressed to allow selective variable transfer of light intensity through the element into the visual field of the user.

34 Claims, 7 Drawing Sheets

VARIABLE IMMERSION VIGNETTING DISPLAY

FIELD

The present invention relates generally to conformally registered display systems including but not limited to head mounted displays, and more specifically to see-through displays for conformally registered display systems.

BACKGROUND

In current head mounted display (HMD) systems, two views are presented to the user of the system. The two views are typically a real world outside view, and a displayed information view which is a generated view. The generated view may be provided by a situational awareness system (SAS). The two views can be overlaid one on top of the other in the sight line of the user in a see-through HMD.

Head mounted displays (HMDs) are extremely useful in any number of situations, including military applications such as flight operations, field operations, and the like. Commercial flight operations also can make use of HMD systems in much the same fashion as military operations. Other uses of HMD systems include use in maintenance operations. For example, a HMD could be used to overlay a schematic of a work area or circuit over the work area or circuit. Also, a list of instructions could be placed in the visual field of the user so as to be seen while a worker is also viewing a real world object on which maintenance is to be performed. The applications are many and varied, and these are just some of the uses of HMDs.

The utility of the see-through HMD design whether implemented in monocular, binocular, or biocular form is that it allows simultaneous viewing of the outside world's visual field in addition to the information directed to the viewer via the Electrooptic display. There are many applications for this such as the coupling of an electronically generated targeting reticule conformally registered to an outside scene for bore sighted weapons system control. Such see-through HMD systems have also been proposed as the visual information conveyance channel for computer-aided situational awareness systems (SAS). The basic idea of these SASs is to provide an individual team worker (or soldier for military applications) the timely and contextually task appropriate information needed to perform his job plan via autonomous SW agents polling, analyzing, fusing all networked data resources available as the work plan/mission progresses. The SAS computer condensed data is then conveyed via several channels (e.g. visual, aural, tactile) to the appropriate individuals in the team. The intent of the SAS is to optimally exploit the available data resources for the best possible collaborative team outcome against the mission/plan objective.

HMD systems typically use a beam splitter in combination with a combiner, as well as software and support hardware, to generate the two superimposed views. The beam splitter has a defined fixed splitting ratio. The beam splitter splits light intensities which are directed to the display in a fixed ratio. The typical beam splitter ratio is a fixed ratio of fifty per cent light intensity from the outside or real world view, and fifty per cent intensity from the displayed information view. As a result, the views overlie one another and are superimposed. Each view is therefore in the visual field of the user. Changing the ratio of real world to displayed information light intensity requires changing the beam splitter for a different ratio beam splitter.

Some tasks are aided well by information available both via direct view and displayed information (such as an oil refinery worker team trying to manage an abnormal situation, or a team of soldiers on a combat mission). However, the compromise 50/50 split is. clearly not optimal for all phases of the work/task cycle to be completed. During some phases of plan execution, the displayed information channel is the desired focus of attention for the user. During other phases of plan execution, the direct view is the desired focus of attention.

Certain problems exist with the use of a fixed ratio beam splitter, no matter what the fixed ratio is. Situations in which a HMD system is used may dramatically and rapidly change over small time periods. It is not practical to reconfigure a current HMD system during use. The beam splitter ratio in place when the situation use begins is for all practical purposes the beam splitter ratio in place when the particular use ends.

However, changing situations may call for or be best served by a change in the beam splitter ratio or real world to displayed information light intensity. For example, in certain situations, it is desirable for the entire visual display to be provided solely by either the real world outside or displayed information views. In the case of a worker studying a schematic, any outside world background may interfere with a portion or portions of the schematic, making it difficult or even impossible to read. In this situation, it would be desirable to exclude the outside world view, and instead transmit only the displayed view. In another instance, the focus of the user may need to be directed entirely to the outside world. For example, when the real world visual field must be searched for a certain object or occurrence, displayed information might interfere with the real world view, or obscure the real world view in some way.

Moreover, the real world, external view is both a see through view and a see in view. HMDs and SASs are also used in widely different ambient lighting conditions. The brighter the ambient light, the more light intensity is admitted into the real world part of the HMD. In very bright light, traditional HMD and SAS systems do not allow light to be denied entrance into the view. Because of this, the intensity of the displayed information must be increased in order to be able to even see it. Since see through ambient light impinges on the display seen by the user, the display electronics for the displayed image must be driven harder to generate a displayed information view that may be seen by the user. The required increase in intensity of the displayed information view puts added stress on the displayed information components. The harder the display electronics must be driven, the more power is used, and the faster the components wear out.

Other displays used with the present technology include conformally registered displays. A conformally registered display need not be head mounted. Instead, a conformally registered display may be generated by a flat panel display placed in the visual field of a user. Further, an entire cockpit canopy of an aircraft may be used as a display.

SUMMARY

The present invention overcomes the problems of the prior art by providing a conformally registered display system with a variable light intensity ratio between the real world and displayed information views. A conformally registered display system according to one embodiment of the invention includes a variably transmissive element positioned in the optical train of the user. The variably transmissive element is capable of adjustment of the ratio of light intensity passed to the user from the real world view to the light intensity passed from the displayed information view of the conformally registered display system to the user.

In another embodiment, the variably transmissive element is physically addressed so that light intensity may be spatially controlled in the visual field of the user. In this embodiment, light intensity in areas of the visual display of the user may be controlled separately from the light intensity of other areas of the display. This allows the user or the controller of the SAS, conformally registered display, or HMD involved with the displayed information to concentrate focus of the user on a specific area of the visual field, or to simultaneously configure one spatial region of the conformally registered display to present solely a displayed information view, while another spatial region presents a combined view or a solely real world view. This spatial discrimination of transmitted light intensity can be used in arbitrarily complex combinations, up to the limit of the spatial resolution of the addressable transmissive element.

In yet another embodiment, the conformally registered display of the present invention may be combined with an auditory domain system that uses the same variable transmissive technique, using active or passive noise suppression to mask undesirable sounds. Further, desirable or necessary sounds could even be enhanced. The directional cueing afforded by the addressable windowing feature of the present invention described above may also be reinforced by the additional auditory channel. Here, the three-dimensional aural cues are presented to the user in coordination with the displayed directional window cue to reinforce its directional information content, Active or passive noise suppression as well as signal enhancement extraction techniques could be used to augment the three-dimensional cueing channels as well.

A method embodiment of the present invention comprises adjusting the ratio of real world to displayed information light intensity to conform the ratio to a dynamically changing situation. This is done by varying the transmittance of a variably transmissive window. The method further comprises spatially addressing the variably transmissive window to selectively change the light intensity passing from the real world view to the visual field of the user. The present method may further comprise auditory domain control using passive or active noise suppression to mask undesirable sounds. This adds high quality three-dimensional aural cueing to reinforce the directional content implicit in the addressable windowing feature of the invention.

The variable splitting ratio so achieved allows adjustable immersion. For example, total immersion is appropriate for some tasks such as collaborative planning in which team members are primarily using their SAS to communicate via a common displayed picture. Here the intrusion of the outside world is a liability and a distraction. However, when in the real time operations mode, the worker requires just the opposite balance of attention focus.

Another operational advantage offered by variable transmissive elements is the maintenance of displayed information contrast ratio performance against high ambient light levels (i.e. an automatic "sunglass" function).

This invention is equally applicable to heads-up displays, head mounted displays, flat panel displays, glareshield displays, and the like, in which a user such as a driver, navigator, or pilot may need to have the real world view contrasted more sharply with the displayed information channel, especially in situations which may rapidly change, such as combat.

Present designs have only a 50/50 or fixed ratio split between the outside world and the displayed information channel. The ratio may not be 50/50, but it is fixed, and cannot be changed, certainly not dynamically. Hardware enables different ways of portraying information. Because the display system is coordinated with the variable transmissive element, variations can be made not only spatially but also in intensity—or example, a target could be the only thing in the outside world visual field of a pilot, allowing the pilot to focus more intently on the target. Specific targets among many could also be visually selected and isolated, allowing better chance for targeting at the proper target. Such variations are well within the scope and skill of one skilled in the art, and many will be thought of, which are still within the scope of the invention.

DESCRIPTION OF EMBODIMENTS

In the following detailed description of the embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Figure 1:
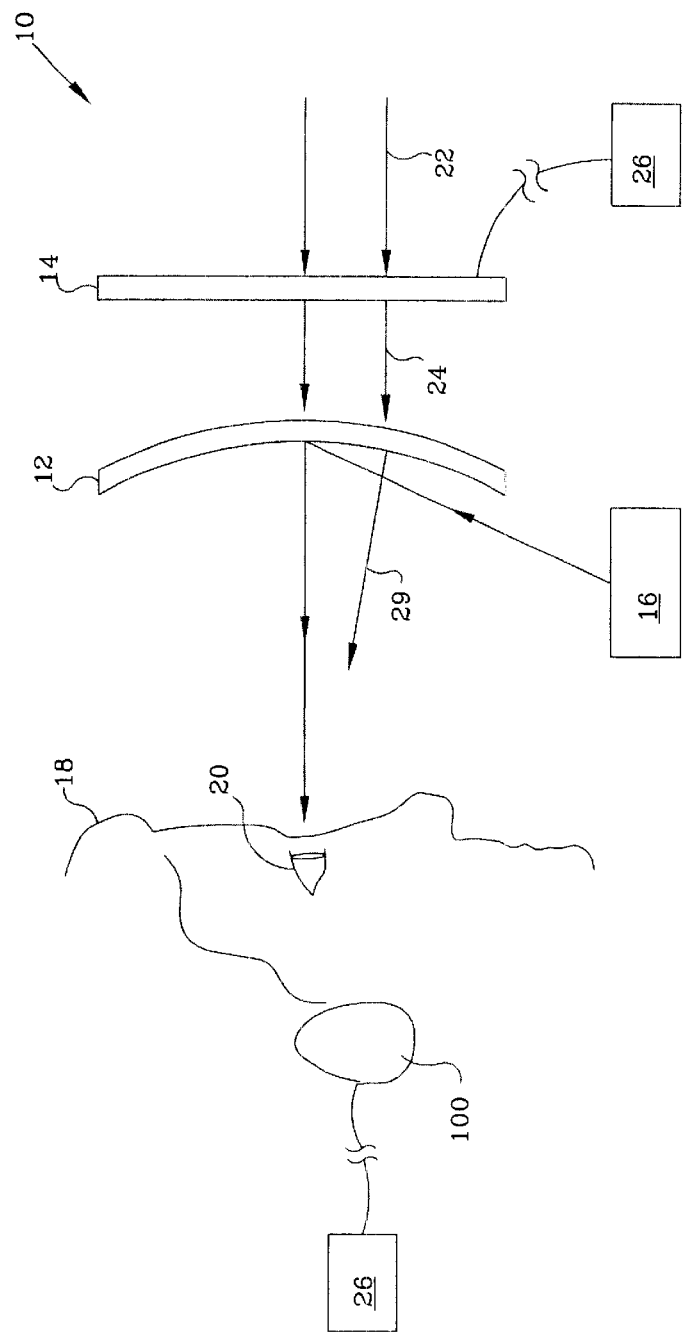
FIG. 1 shows a perspective view of an embodiment of the present invention.

FIG. 1 shows a conformally registered display 10 according to one embodiment of the invention. Display 10 in one embodiment is a HMD 10 comprising a combiner 12, a variably transmissive element 14, and display optical system 16. The combiner 12 is positioned in the visual field of a user 18. The combiner 12 focuses optical data generated by the display optical system toward the eye 20 of user 18. Display optical system 16 generated display information through the use of display drivers, as is known in the art. The display optical system 16 may be any system capable of generating a display information optical train for use in a conformally registered display or situational awareness system (SAS). The display optical system could also include the combiner, so that the display optical system includes the optical train and the combiner.

Real world, or outside, imagery is also in the visual field of the user 18. The real world imagery passes through variably transmissive element 14 and combiner 12 to reach the eye 20 of user 18. In this manner, the real world view and the display information view are both presented to the visual field of the user 18.

While variably transmissive element is shown just outside the combiner 12 in FIG. 1, insertion of the element 14 at other locations in the optical train could help to reduce overall size and weight of a HMD system such as HMD 10. Such modification is within the scope of one skilled in the art.

Variably transmissive element 14 is adjustable to allow a variable amount of light intensity to pass through to the eye 20 of user 18. As shown in FIG. 1, real world information 22 passes through variably transmissive element 14, emerging with light intensity 24. Variably transmissive element 14 is operatively connected to a control module 26 which controls the amount of light intensity of the real world information passes through element 14. Control module 26 may be operated manually, or may be controlled through use of a computer program or electrical control system, which may or may not be integrated with the display optical system 16.

Variably transmissive element 14 may be any structure which allows for varying the intensity of light which passes through it. For example, variably transmissive element 14 may allow for adjustment of the light intensity passing therethrough in any number of ways. For example, element 14 could employ a polarizer arrangement, in which the relative orientation of the polarization can be varied to adjust the light intensity passing through the element 14. Similarly, cholesteric liquid crystals could be used in element 14, allowing electrooptic transmittance adjustment. While these schemes would effectively allow dynamic and variable adjustment of the light intensity passing through element 14, each also is characterized by a 50% transmittance loss imposed by the use of polarizers. Variably transmissive element 14 may be implemented in a flat panel window, or other transmissive structures known in the art.

Other electrooptic approaches that do not have the polarizer loss penalty would be preferred. Such approaches include electrochromic and electric field alignable suspended particle shutters. Electrochromic options include both liquid cell and thin film solid state electrolyte devices. Both use electric current to drive reversible chemical reactions in thin film electrodes, whose chemical oxidation-reduction state determines their optical transmittance. Such electrochromic devices may also be spatially addressable with the use of pixel sub electrodes or any transmissivity control effectors.

In another embodiment, another display uses a variably transmissive element which is not uniform across the EO spectrum. Such a display uses subtractive elements to vary transmissivity with chromatic preference. For example, such an embodiment may block all ambient red light, or the like. In further embodiments, spectrally differentiable transmissivity elements are used.

Figure 2:
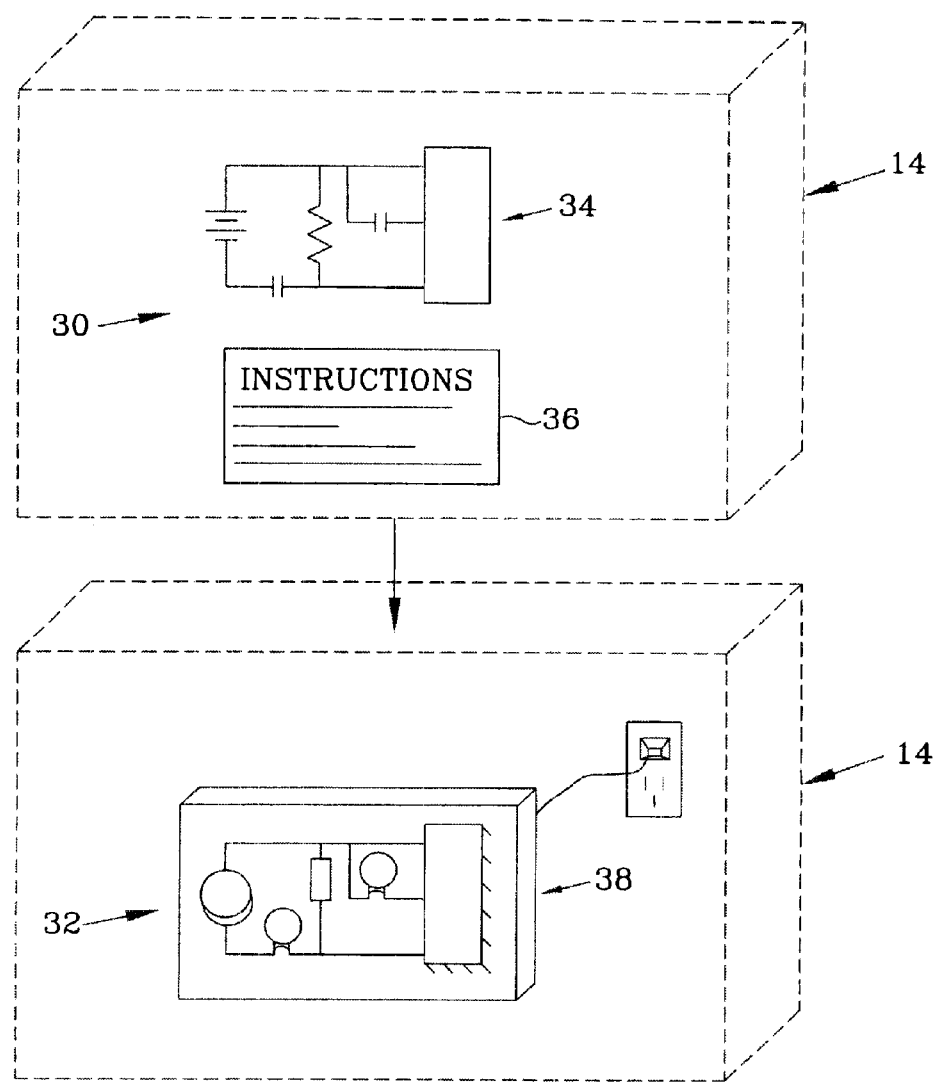
FIG. 2 is a view of a representative visual field as seen through the embodiment of FIG. 1.
Figure 3:
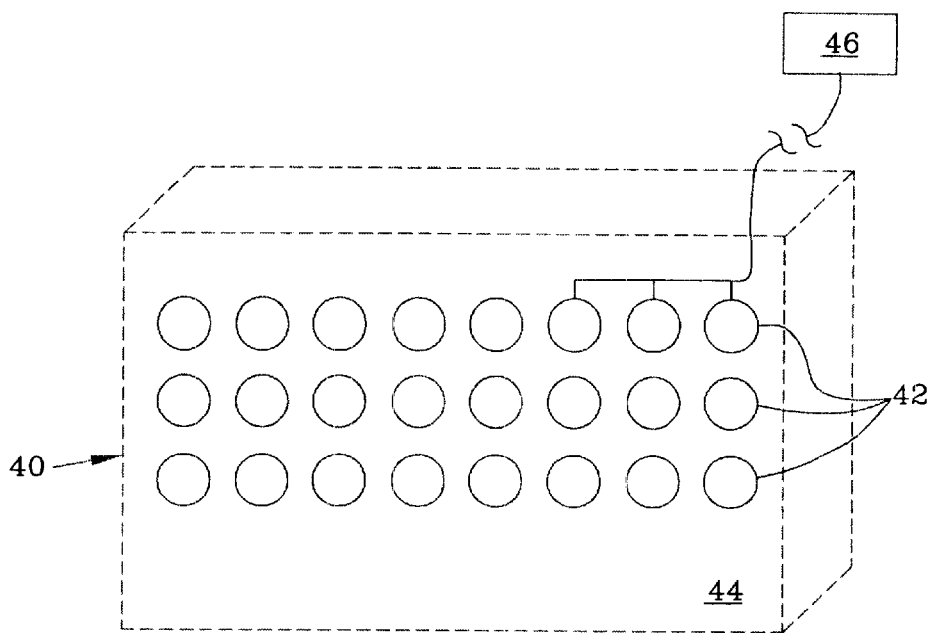
FIG. 3 is a perspective view of an alternative embodiment of the present invention.

FIG. 2 is a view of a representative variably transmissive element 14 as has been described above. Varying the intensity of the light that passes through the element 14 results in a visual field for the user 20 which may present real world and displayed information views with emphasis placed on one or the other, and which may be varied by control of the transmissivity of element 14. FIG. 3, for example, shows a representative visual field of a user when the variably transmissive element 14 has completely blocked light intensity from the real world view to the user, and the visual field of the user is fully focused on a schematic 28 and a set of instructions 30 generated by the display optical system 16. When a user has finished studying the schematic 28 and instructions 30, the variably transmissive element 14 can have its transmission of light intensity increased to allow the real world view of an actual electric circuit 32 to appear in the user's visual field. The display optical system can at the same time eliminate the transmission of the schematic 28 and instructions 30 to the combiner 12, and instead allow the user to see the entire visual field of the circuit 30.

The visual field of a user can be strictly and widely controlled by the present invention, so as to provide adjustable immersion between the real world and the displayed information. For example, FIG. 2 shows a representative example of the type of displays and visual field effects capable of presentation by the present invention. The displays 30 and 32 are presented to the visual field of a user as best shown in FIG. 1. Display 30 is presented showing a schematic diagram 34 of a circuit, and instructions for testing or maintaining the circuit 36. The schematic 34 and instructions 36 are placed in the visual field of a user by controlling the light intensity of the real world view passing through the variably transmissive element 14, which is shown in shadow in FIG. 2. It should be understood that the image viewed is not displayed on the variably transmissive element, but is placed in the visual field of the user by the display optical system 16, combiner 12, and variably transmissive element 14.

Display 30 is generated by blocking all or substantially all of the light intensity from the real world view from passing through variably transmissive element 14. This allows the user to see the circuit schematic 34 and instructions 36 without interference from outside light or a real world view. When the user has sufficiently studied or reviewed the schematic 34 and instructions 36, the control module 26 adjusts the light intensity passing through variably transmissive element 14 to permit light intensity from the real world view to pass through element 14. At the same time, display optical system 16 reduces or even eliminates the transmission of the displayed information, i.e. the schematic 34 and instructions 36. The user then sees the actual circuit 38 in real world view in the visual field. In this manner, the real world and displayed information views may be superimposed with variable intensity ration between the real world and displayed information views. Either the real world or displayed information views may be completely eliminated, by the variably transmissive element 14 or the display optical system 16, respectively.

In another embodiment of the present invention, a variably transmissive element 40 may be spatially addressed using a plurality of electrodes 42 as is best shown in FIG. 3. Each electrode 42 could allow the specifically addressed area of the face 44 of element 40 to be varied in the amount of light intensity of the real world scene passes through the element 40. In this manner, certain external views could be transmitted with greater intensity, and other external views could be transmitted with lesser light intensity. This configuration allows a control module 36 to control the light intensity of the external view passing through the transmissive element 34 according to the addressing of the element 40. The spatially addressable nature of element 40 allows for spatial attention focus of the user on specific areas in the visual field. The addressing of the element 40 allows for the adjustment of light intensity passing through from the real world view to the visual field of the user in increments smaller than the full field.

Figure 4:
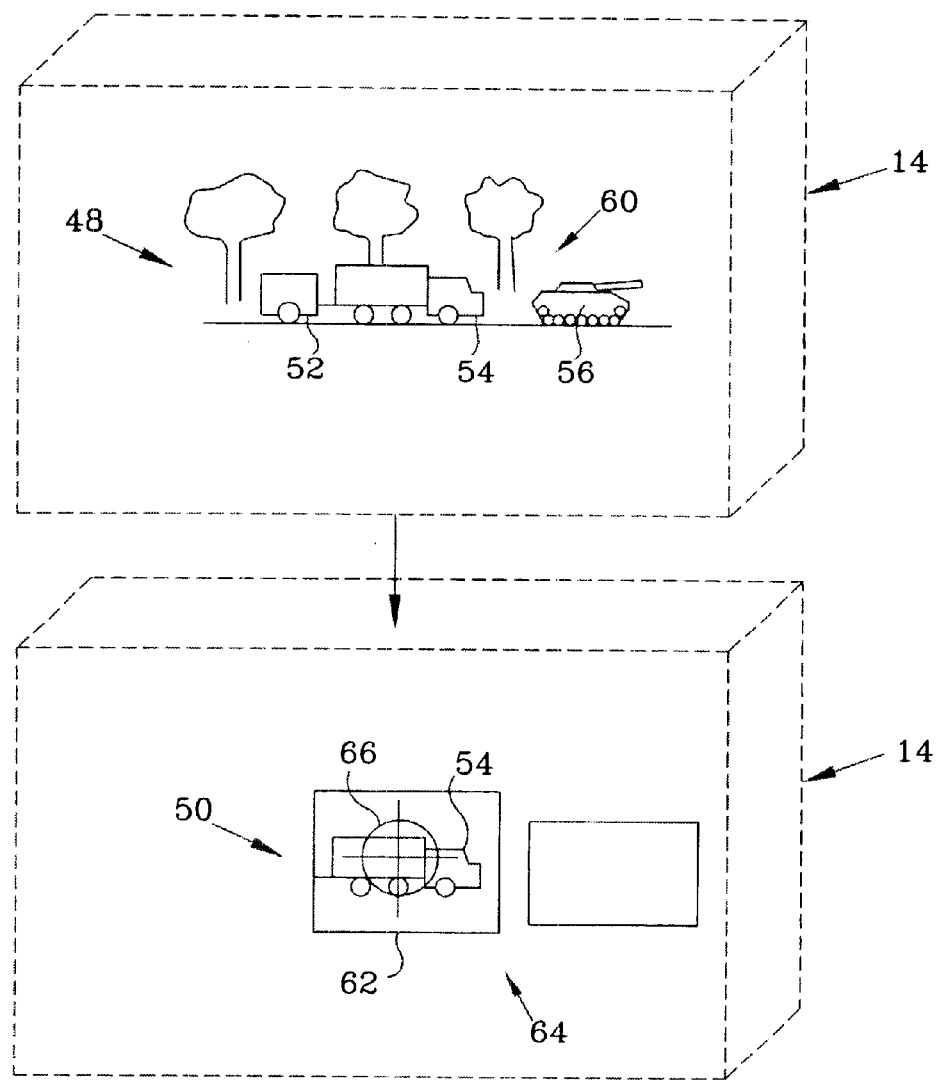
FIG. 4 is a view of a representative visual field as seen through the embodiment of FIG. 3.
Figure 5C:
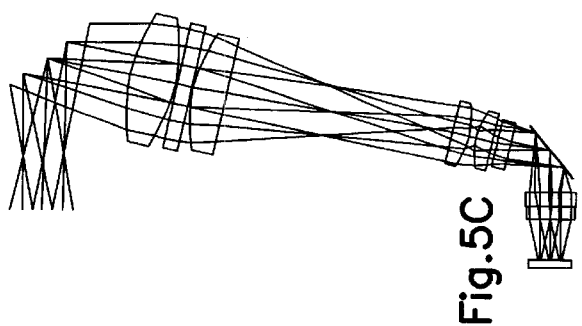
FIGS. 5A–5G shows a representative sample of optical trains that may be used with embodiments of the present invention.
Figure 5G:
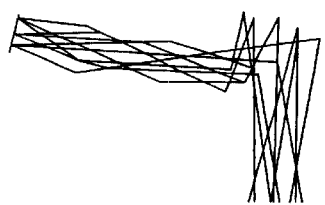
Figure 5B:
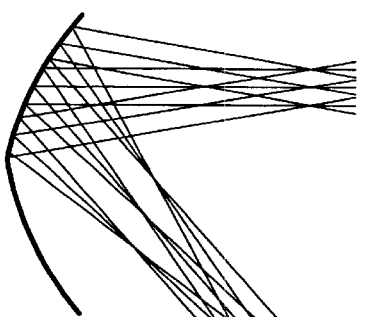
Figure 5F:
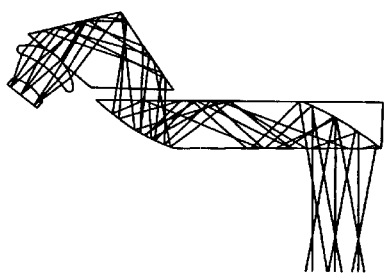
Figure 5E:
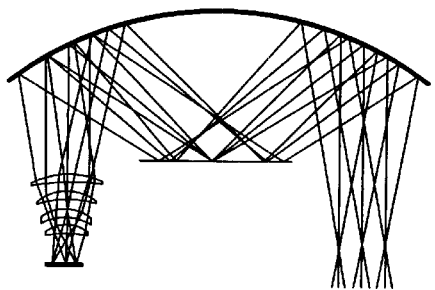
Figure 5A:
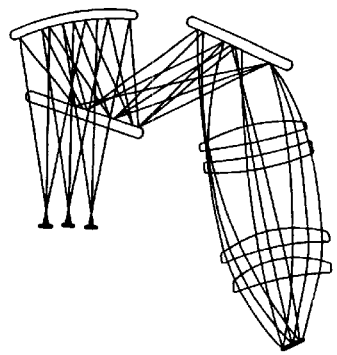
Figure 5D:
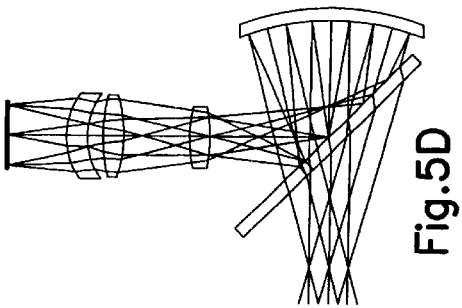

For example, FIG. 4 is a set of views of representative visual fields 48 and 50 of a user of the addressable variably transmissive element 40. In view 48, the addressable variably transmissive element 40 has been addressed to allow light intensity to pass through from the real world to the visual field of the user to allow the use to see objects in the real world. In view 48, the user sees trucks 52 and 54, tank 56, and background forest 60. In certain situations, where the visual field, such as field 48, has many different objects in view, it may be desirable to isolate the focus of the user on a particular object or area of the visual field. The addressable nature of element 40 allows that focus to be made.

In view 50, suppose for example that a determination has been made that the focus of the user should be on truck 54. The spatial addressing capability of element 40 allows control of the light intensity passing from the real world through the element 40 so as to block light intensity in spatial area 64, and transmit real world light intensity in spatial area 62 to isolate truck 54 in the visual field of the user. Further, a display optical system such as system 16 could be used to place an electronically generated targeting reticle 66 over the truck 54 to be targeted. Specific target instructions could be displayed in spatial area 68.

The variably transmissive element 14 and the addressable variably transmissive element 40 may be implemented in a HMD system such as system 10 as shown in FIG. 1. Any number of optical designs for display optical system 16 may be employed with the variably transmissive elements 14 and 40. FIG. 5 shows a representative sample of optical designs A, B, C, D, E, F, and G which are each capable of use in a system such as system 10. In all of the designs, a variably transmissive element such as element 14 or element 40 may be placed between a user's eye and the real world visual field. Placement of an element 14 or 40 has been discussed above.

The addressable nature of variably transmissive, element 40 is particularly valuable if used in a head tracked conformally registered system. In such systems, geometrically registered with the real world view. Hence, in such a system the SAS could display information relevant to the task on a 0% transmission background, while allowing 100% transmission view of other parts of the real world scene. In other words, the real world image could be registered with the generated image to be coincident with the eye gaze direction of the user via head/eye tracking devices as appropriate to the specific application.

For example, maintenance workers need to view reference materials while nearly simultaneously viewing the work space and operation of their hands. Similarly, a moveable highlighting window or box could focus attention to any arbitrary interesting item identified by the SAS. This may result in a less confusing and more intuitively interpretable attention directing conveyance means than alternative approaches such as flashing icons, variable colors, and the like.

Figure 7:
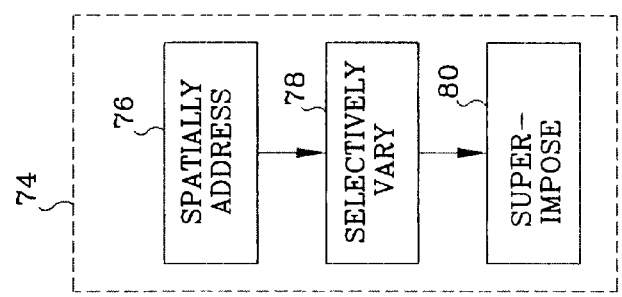
FIG. 7 is a flow chart diagram of another method embodiment of the present invention.
Figure 6:
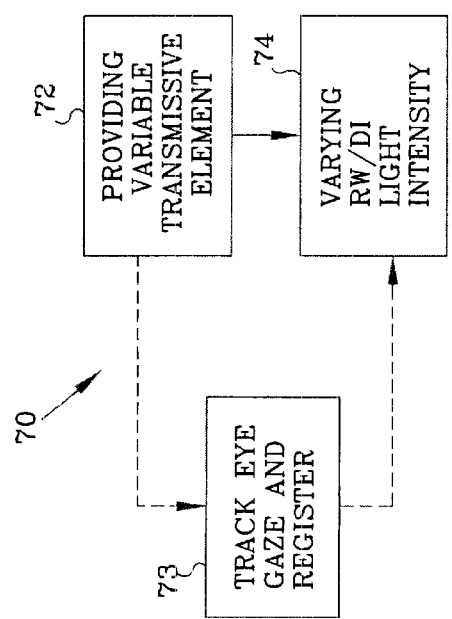
FIG. 6 is a flow chart diagram of a method embodiment of the present invention.

FIG. 6 is a flow chart diagram of a method 70 embodying the present invention. Method 70 comprises providing a variably transmissive element in a head mounted display system in block 72, and varying the ratio of real world light intensity to generated display light intensity in block 74. The varying of the ratio of real world light intensity to generated display light intensity in block 74 may further comprise spatially addressing the variably transmissive element in block 76, selectively varying the ratio of real world to generated display light intensity in block 78, and superimposing a displayed light intensity object selectively in the user's visual field in block 80, as is best shown in FIG. 7. The method 70 could also optionally include registering the real world image with the generated image to be coincident with the eye gaze direction of the user as described above. This is shown in FIG. 7 as optional block 73.

Figure 8:
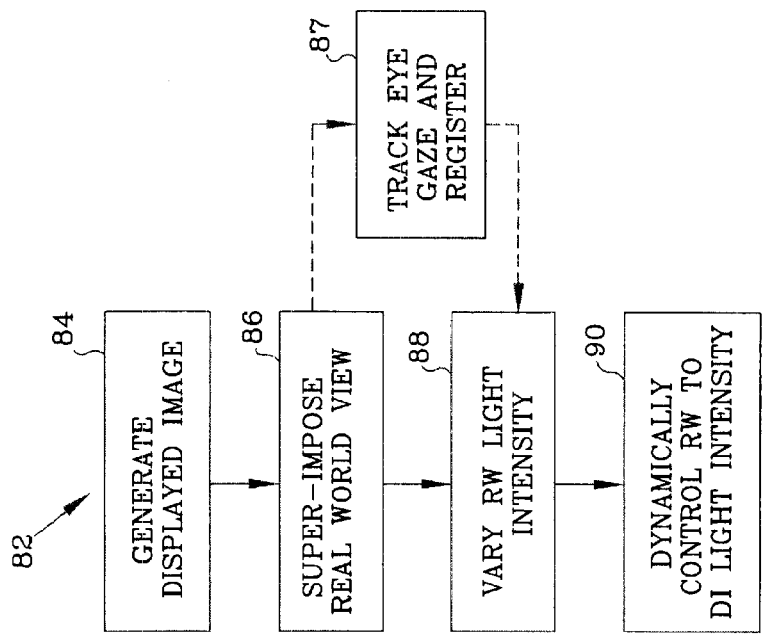
FIG. 8 is a flow chart diagram of another method embodiment of the present invention.

In a further method embodiment 82 shown in FIG. 8, a method 82 for varying the light intensity in a head mounted display comprises generating a displayed image for presentation to a user's visual field in block 84, superimposing a real world view on the displayed image in the user's visual field in block 86, varying the light intensity of the real world view by altering the transmissivity of a variable transmissive window in block 88, and dynamically controlling the ratio of displayed image intensity to real world light intensity in the user's visual field in block 90. The method 82 could also optionally include registering the real world image with the generated image to be coincident with the eye gaze direction of the user as described above. This is shown in FIG. 8 as optional block 87.

Another application of the methods and apparatus of the present invention is to other modes of conveyance. For example, in the auditory domain, active noise suppression techniques may be used to fully mask undesirable environmental sounds. However, in many domains, external auditory cues may have great importance and meaning. For example, in a military domain, the sound of a branch cracking underfoot may be highly relevant to a combat soldier, while the noise from weapons fire of his teammates may be nearly irrelevant. This of course depends on context. In particular, when the SAS is attempting to convey information via the auditory channel (e.g. mechanized threat location), environmental sound which masks the input is distracting and also a liability. Similarly, in a refinery application, motor or pump noise may be highly relevant in some situations, as are radio transmissions from the board operator or field team members in other situations. A variably transmissive aural element would allow active control of the focus of the attention of the user. Such an element 100 is shown in FIG. 1. Variably transmissive auditory element 100 may be connected to and controlled by control module 26. Alternatively, element 100 may have its own control module.

Further, as discussed for the visual domain, an addressable capability auditory element would allow an additional level of control flexibility. For example, the ability to mask sounds from a particular sector (which contains the unit mortar or refinery compressor for example) while allowing full pass-through (or even amplified pass-through) transmission of sounds from the sector ahead provides the spatial attention focusing capability of the spatially addressable variable transmissive element 40 discussed above.

In another embodiment, a variably transmissive auditory element such as element 100 is utilized separate from the HMD or conformally registered display. In this embodiment, the variably transmissive auditory element, such as element 100, is equipped with its own control module as discussed above. The variably transmissive auditory element selectively passes auditory signals to the ear of the user. The control module is operatively connected to the variably transmissive auditory element to control the sound passing through the variably transmissive auditory element.

The embodiments of the present invention are described in terms of a head mounted display. It should be understood that a conformally registered display may be used for all embodiments. Conformally registered displays as defined above include such displays as entire windshield or canopy views. In a conformally registered display, given a point in the-real world view, often referred to as 3-space, and an eye position for the user, the pixel or pel that lies on a vector connecting the point in 3-space and the eye of the user can be determined. Any system of a conformally registered display is capable of use with the various embodiments of the invention, and such conformally registered displays are within the scope of the invention.

Views in a conformally registered display may be in an aircraft or a vehicle. For example, a panoramic cockpit display in an aircraft may be used as a display. A heads-up display may be implemented in a portion of a windshield or canopy, or in a glare shield or the like.

The apparatuses 10 and 100 shown in FIG. 1, and the various display optics trains shown in FIG. 5, may be contained or arranged in any number of see through displays, including but not limited to helmet mounted displays, head mounted displays, conformally registered displays, flat panel displays, glareshield mounted displays, and the like. The elements may be combined in visors, entire aircraft canopy or vehicle windshield views and other conformally registered displays. Such displays may be implemented in monocular, biocular, and binocular form, and the like, without departing from the scope of the invention.

Figure 9:
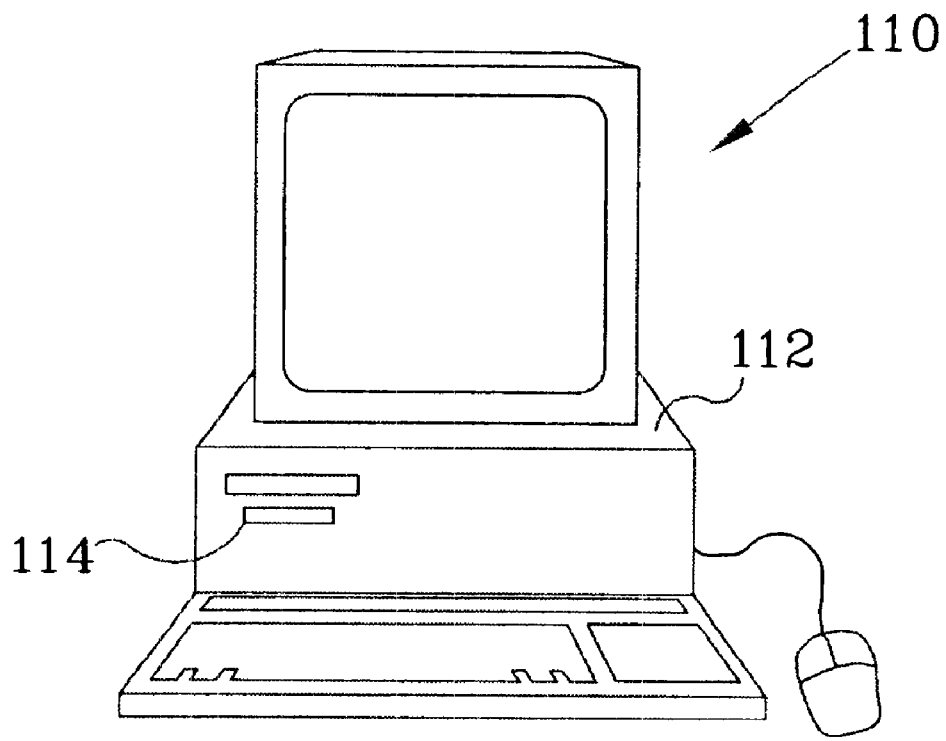
FIG. 9 is a block diagram of a computer system of the type on which embodiments of the present invention may be utilized.

Methods 70 and 82 in one embodiment may comprise computer programs written to perform the methods on a personal computer 110 as shown in FIG. 9. The computer programs run on the central processing unit 112 out of main memory, and may be transferred to main memory from permanent storage via disk drive 114 when stored on removable media or via a network connection or modem connection when stored outside of the personal computer, or via other types of computer or machine readable medium from which it can be read and utilized. The computer programs comprise multiple modules or objects to perform the methods 70 and 82. The type of computer programming languages used to write the code may vary between procedural code type languages to object oriented languages. The files or objects need not have a one to one correspondence to the modules or method steps described depending on the desires of the programmer. Further, the method and apparatus may comprise combinations of software, hardware and firmware as is well known to those skilled in the art.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A view registered display, comprising:
   a display optical system for generating a displayed information view superimposed over a real world view;
   a combiner; and
   a variably transmissive element disposed outside of the combiner at an input end of the display, wherein the variably transmissive element is capable of adjusting a ratio of light intensity of the real world view to a light intensity of the displayed information view.

2. The view registered display of claim 1, wherein the variably transmissive element is a flat panel window.

3. The view registered display of claim 1, wherein the variably transmissive element is disposed immediately adjacent the combiner.

4. The view registered display of claim 1, and further comprising:
   a control module, operatively connected to the variably transmissive element to control the amount of light intensity passing through the variably transmissive element.

5. The view registered display of claim 1, wherein the variably transmissive element is an electrochromic window.

6. The view registered display of claim 1, wherein the variably transmissive element is a pair of cross polarized panels wherein relative orientation of polarization can be varied.

7. The view registered display of claim 1, wherein the variably transmissive element is a cholesteric liquid crystal window.

8. The view registered display of claim 1, wherein the variably transmissive element is a window having electric field alignable suspended particle shutters.

9. The view registered display of claim 1, and further comprising:
   a plurality of spaced apart transmissivity control effectors positioned on the variably transmissive element, each transmissivity control effector spatially addressing a portion of the variably transmissive element.

10. The view registered display of claim 1, wherein the view registered display is a head mounted display.

11. The view registered display of claim 1, wherein the view registered display is a see through display.

12. The view registered display of claim 1, wherein the variably transmissive element is spectrally differentiable.

13. A view registered display, comprising:
    a variably transmissive element positioned immediately adjacent a real world view at an input end of the view registered display and arranged in an optical path between the real world view and an eye of a user; and
    a display optical system arranged between the eye and the variable transmissive element, for generating a displayed information image superimposed over the real world view in the visual field of the user.

14. The view registered display of claim 13, wherein the variably transmissive element is an electrochromic window.

15. The view registered display of claim 13, wherein the variably transmissive element is a pair of cross polarized panels wherein relative orientation of polarization can be varied.

16. The view registered display of claim 13, wherein the variably transmissive element is a cholesteric liquid crystal window.

17. The view registered display of claim 13, wherein the variably transmissive element is a window having electric field alignable suspended particle shutters.

18. The view registered display of claim 13, and further comprising:
    a plurality of spaced apart transmissivity control effectors spatially addressing the variably transmissive element.

19. The view registered display of claim 18, wherein each of the plurality of, transmissivity control effectors spatially addresses a unique portion of the variably transmissive element.

20. The view registered display of claim 13, wherein the view registered display is a head mounted display.

21. The view registered display of claim 13, wherein the view registered display is a see through display.

22. A method, comprising:
    providing a variably transmissive element in a view registered display system having a displayed information image, wherein real world light entering the view registered display system is first incident, on the variable transmissive element arranged at an input end of the view registered display; and
    varying the ratio of the intensity of real world light entering a visual field of a user of the system to the displayed information image.

23. The method of claim 22, wherein varying the ratio further comprises:

spatially addressing the variably transmissive element; and selectively varying the transmission of real world light intensity through the variably transmissive element to change the ratio of the light intensity of the real world view to the light intensity of the displayed information image.

24. A machine readable medium comprising machine readable instructions for causing a computer to perform a method comprising:

varying the ratio of the intensity of real world light entering a visual field of a user through a variable transmissive element arranged at an input end of a conformally registered display system to a displayed information image.

25. The machine readable medium of claim 24, wherein the machine readable medium further comprises machine readable instructions for causing the computer to selectively vary the transmission of real world light intensity through the variably transmissive element of the conformally registered display system to change the ratio of the light intensity of the real world view to the light intensity of the displayed information image.

26. The view registered display of claim 1, and further comprising:

a variably transmissive auditory element for selectively passing auditory signals to an ear of the user.

27. The method of claim 22, and further comprising:

providing filtered ambient sound to an ear of the user.

28. A method of operating a view registered display, comprising:

generating a displayed image in a visual field of a user;

superimposing a real world view and the displayed image in the visual field of the user;

varying the light intensity of the real world view in the visual field of the user by passing the light intensity of the real world view through a variable transmissive element arranged at an input end of the display; and dynamically controlling the ratio of light intensity of the real world view to the light intensity of the displayed image view in the visual field of the user.

29. The method of claim 28, wherein passing the real world view through a variably transmissive element further comprises passing the real world view through a spectrally differentiable variably transmissive element.

30. The method of claim 27, wherein varying also comprises spatially varying the light intensity of the real world view.

31. A method comprising:

varying the ratio of the intensity of real world light entering a visual field of a user of a conformally registered display system to a displayed information image by first passing the real world light through a variably transmissive element located at an input end of the system.

32. A view registered display system, comprising:

a display for display of a generated view, wherein the display is variably transmissive at an input end; and a tracking module, the tracking module spatially registering a real world view and the generated view; and a control module operatively connected to the display to control the amount of light intensity passing through the display at the input end.

33. The view registered display system of claim 32, wherein the tracking module is a head tracking module.

34. The view registered display system of claim 32, wherein the tracking module is an eye tracking module.

* * * * *